United States Patent
Owechko

(10) Patent No.: US 11,592,820 B2
(45) Date of Patent: Feb. 28, 2023

(54) OBSTACLE DETECTION AND VEHICLE NAVIGATION USING RESOLUTION-ADAPTIVE FUSION OF POINT CLOUDS

(71) Applicant: The Boeing Company, Chicago, IL (US)

(72) Inventor: Yuri Owechko, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 605 days.

(21) Appl. No.: 16/570,139

(22) Filed: Sep. 13, 2019

(65) Prior Publication Data

US 2021/0080952 A1 Mar. 18, 2021

(51) Int. Cl.
G05D 1/00 (2006.01)
G05D 1/02 (2020.01)
(Continued)

(52) U.S. Cl.
CPC ......... *G05D 1/0088* (2013.01); *G05D 1/0231* (2013.01); *G06K 9/6289* (2013.01);
(Continued)

(58) Field of Classification Search
CPC .... G05D 1/0088; G05D 1/0231; G06V 20/58; G06K 9/6289; G06T 5/003;
(Continued)

(56) References Cited

U.S. PATENT DOCUMENTS 8,072,450 B2 12/2011 Chang et al.
8,983,794 B1 3/2015 Motzer et al.
(Continued)

FOREIGN PATENT DOCUMENTS

FR 2992762 A1 1/2014

OTHER PUBLICATIONS

Eiben, A.E., et al. "Genetic algorithms with multi-parent recombination," PPSN III: Proceedings of the International Conference on Evolutionary Computation, The Third Conference on Parallel Problem Solving from Nature, 1994, pp. 78-87.
(Continued)

*Primary Examiner* — Ig T An
(74) *Attorney, Agent, or Firm* — Sage Patent Group

(57) ABSTRACT

A method for obstacle detection and navigation of a vehicle using resolution-adaptive fusion includes performing, by a processor, a resolution-adaptive fusion of at least a first three-dimensional (3D) point cloud and a second 3D point cloud to generate a fused, denoised, and resolution-optimized 3D point cloud that represents an environment associated with the vehicle. The first 3D point cloud is generated by a first-type 3D scanning sensor, and the second 3D point cloud is generated by a second-type 3D scanning sensor. The second-type 3D scanning sensor includes a different resolution in each of a plurality of different measurement dimensions relative to the first-type 3D scanning sensor. The method also includes detecting obstacles and navigating the vehicle using the fused, denoised, and resolution-optimized 3D point cloud.

20 Claims, 11 Drawing Sheets

(51) Int. Cl.
*G06K 9/62* (2022.01)
*G06T 5/00* (2006.01)
*G06V 20/58* (2022.01)
*G01S 13/931* (2020.01)
*G01C 3/08* (2006.01)
*G01S 13/86* (2006.01)
*G01S 13/42* (2006.01)

(52) U.S. Cl.
CPC ............ *G06T 5/003* (2013.01); *G06V 20/58* (2022.01); *G01C 3/08* (2013.01); *G01S 13/42* (2013.01); *G01S 13/86* (2013.01); *G01S 13/931* (2013.01); *G01S 2013/9323* (2020.01); *G06T 2207/10028* (2013.01); *G06T 2207/30261* (2013.01)

(58) Field of Classification Search
CPC ........... G06T 2207/10028; G06T 2207/30261; G01C 3/08; G01S 2013/9323; G01S 13/42; G01S 13/86; G01S 13/931
See application file for complete search history.

(56) References Cited

U.S. PATENT DOCUMENTS

| | | | |
|---|---|---|---|
| 10,354,444 | B2 | 7/2019 | Owechko |
| 2002/0167518 | A1 | 11/2002 | Migdal et al. |
| 2005/0140670 | A1 | 6/2005 | Wu et al. |
| 2006/0142971 | A1 | 6/2006 | Reich et al. |
| 2011/0316978 | A1 | 12/2011 | Dillon et al. |
| 2012/0301013 | A1 | 11/2012 | Gu |
| 2015/0213646 | A1 | 7/2015 | Ma et al. |
| 2015/0294036 | A1 | 10/2015 | Bonner |
| 2015/0363972 | A1 | 12/2015 | Isaksson et al. |
| 2016/0227193 | A1* | 8/2016 | Osterwood ............ B25J 9/1697 |
| 2016/0261844 | A1 | 9/2016 | Kadambi et al. |
| 2017/0004649 | A1 | 1/2017 | Collet Romea et al. |
| 2017/0010087 | A1 | 1/2017 | Polidor et al. |
| 2017/0053438 | A1 | 2/2017 | Huang et al. |
| 2017/0193699 | A1 | 7/2017 | Mehr et al. |
| 2018/0313940 | A1* | 11/2018 | Wu ........................... G06T 7/13 |
| 2018/0364731 | A1* | 12/2018 | Liu ........................ G06V 10/40 |
| 2019/0035148 | A1* | 1/2019 | Owechko ................ G06T 19/00 |
| 2019/0064364 | A1* | 2/2019 | Boysel ................... G01S 17/933 |

OTHER PUBLICATIONS

Kennedy, James, et al.; "Particle Swarm Optimization," Proceedings of IEEE International Conference on Neural Networks, IV, 1995, pp. 1942-1948.

Powell, M.J.D., "An efficient method for finding the minimum of a function of several variables without calculating derivatives," Computer Journal, 7(2), 1964, pp. 155-162.

Kadambi, Achuta, et al.; "Polarized 3D: High-Quality Depth Sensing with Polarization Cues," 2015 IEEE International Conference on Computer Vision, 2015, pp. 3370-3378.

Miahdaoui, Abdelaaziz, et al.; "Comparative Study of Combinatorial 3D Reconstruction Algorithms," International Journal of Engineering Trends and Technology, 2017, pp. 247-251, vol. 48.

European Patent Office; European Search Report for European Application No. 18174588 dated Aug. 15, 2018, 4 pages.

European Patent Office; Office Action for European Application No. 18173753.7 dated Aug. 30, 2018, 11 pages.

European Patent Office; Office Action for European Application No. 18174588.6 dated Sep. 10, 2018, 8 pages.

Extended European Search Report dated Jan. 27, 2021 for European Patent Application No. 20196048.1, 8 pages.

Janai, Joel et al. "Computer Vision for Autonomous Vehicles: Problems, Datasets and State of the Art," arXiv.org, Cornell University Library, Ithaca, New York, Apr. 18, 2017, 67 pages.

* cited by examiner

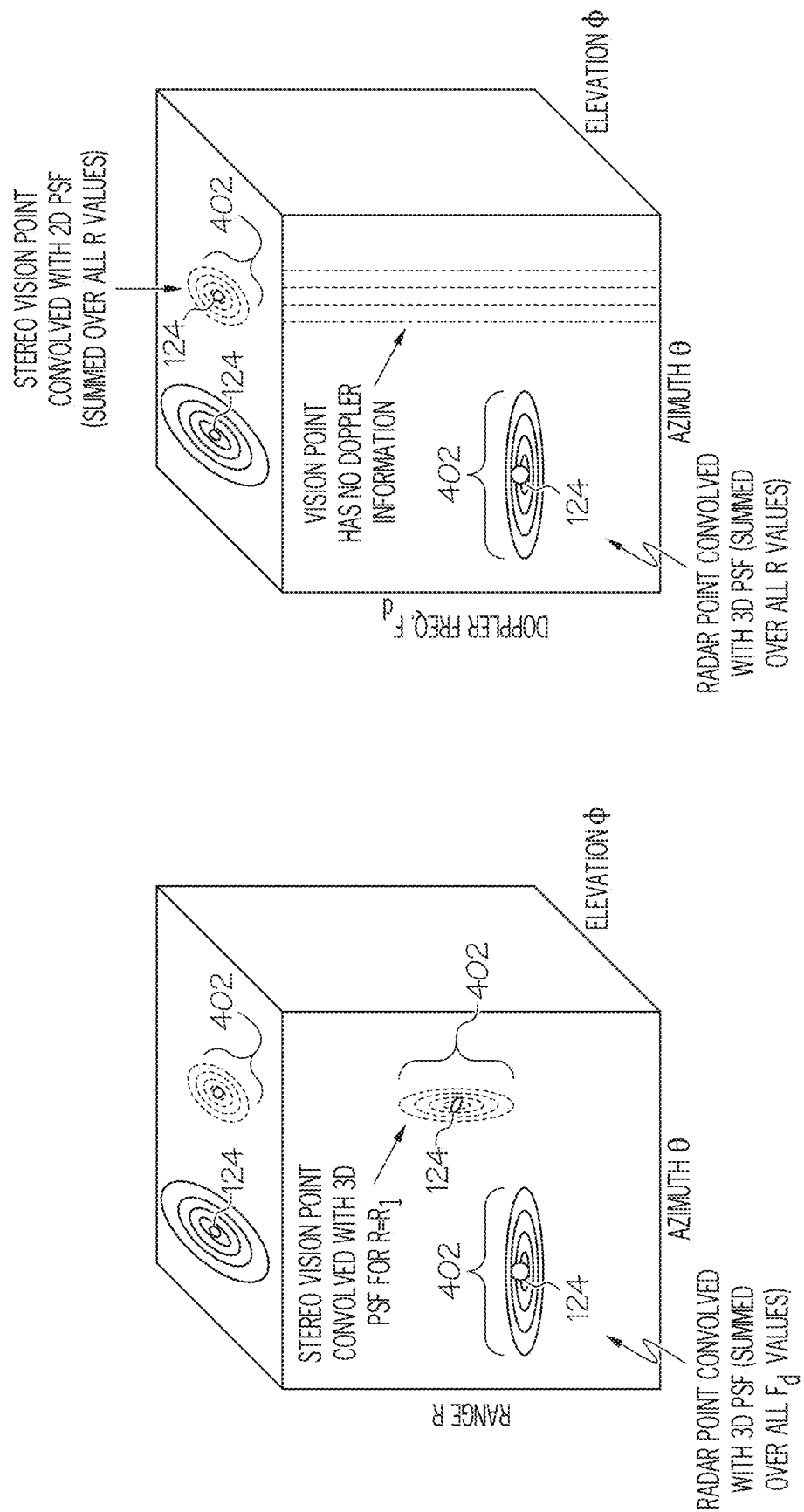

OBSTACLE DETECTION AND VEHICLE NAVIGATION USING RESOLUTION-ADAPTIVE FUSION OF POINT CLOUDS

FIELD

The present disclosure relates to obstacle detection and vehicle navigation and more particularly to obstacle detection and vehicle navigation using resolution-adaptive fusion of point clouds.

BACKGROUND

Autonomous vehicles may use three-dimensional (3D) scanning devices, such as Light Detection and Ranging (LIDAR) sensors, vision sensors, radar, or other 3D sensing devices for use in obstacle detection and vehicle navigation. Such sensors are capable of generating point clouds which can be combined using a sensor fusion method or process. Some existing sensor fusion methods process raw point cloud data from each sensor separately and independently, and then perform fusion by combining object tracks from the different sensors. Other sensor fusion methods perform fusion at the point cloud level but only by registering and aligning the point clouds in a common coordinate system and then fitting a mesh or surface to the composite point clouds. These existing point cloud fusion methods do not consider resolution differences of sensors and do not compensate for poor resolution of a particular type sensor in one or more dimensions. Accordingly, there is a need for processing point clouds from different-types of sensors that takes into consideration sensor resolution and automatically compensates for a sensor's poor resolution to detect obstacles for navigation of a vehicle.

SUMMARY

In accordance with an embodiment, a method for obstacle detection and navigation of a vehicle using resolution-adaptive fusion includes performing, by a processor, a resolution-adaptive fusion of at least a first three-dimensional (3D) point cloud and a second 3D point cloud to generate a fused, denoised, and resolution-optimized 3D point cloud that represents an environment associated with the vehicle. The first 3D point cloud is generated by a first-type 3D scanning sensor and the second 3D point cloud is generated by a second-type 3D scanning sensor. The second-type 3D scanning sensor includes a different resolution in each of a plurality of different measurement dimensions relative to the first-type 3D scanning sensor. The method also includes detecting obstacles and navigating the vehicle using the fused, denoised, and resolution-optimized 3D point cloud.

In accordance with an embodiment, a system for obstacle detection and navigation of a vehicle using resolution-adaptive fusion includes a processor and a memory associated with the processor. The memory includes computer-readable program instructions that, when executed by the processor, causes the processor to perform a set of functions. The set of functions include performing a resolution-adaptive fusion of at least a first three-dimensional (3D) point cloud and a second 3D point cloud to generate a fused, denoised, and resolution-optimized 3D point cloud that represents an environment associated with the vehicle. The first 3D point cloud is generated by a first-type 3D scanning sensor and the second 3D point cloud is generated by a second-type 3D scanning sensor. The second-type 3D scanning sensor includes a different resolution in each of a plurality of different measurement dimensions relative to the first-type 3D scanning sensor. The set of functions also includes detecting obstacles and navigating the vehicle using the fused, denoised, and resolution-optimized 3D point cloud.

In accordance with an embodiment and any of the preceding embodiment, wherein performing the resolution-adaptive fusion includes generating a first volumetric surface function by performing a 3D convolution of each measured point from a plurality of measured points of the first 3D point cloud with an associated 3D point spread function of the first-type 3D scanning sensor for representing an uncertainty in a spatial location of each measured point. The first volumetric surface function incorporates a resolution of the first-type 3D scanning sensor. Performing the resolution-adaptive fusion also includes generating a second volumetric surface function by performing a 3D convolution of each measured point from a plurality of measured points of the second 3D point cloud with an associated 3D points spread function of the second-type 3D scanning sensor for representing an uncertainty in a spatial location of each measured point. The second volumetric surface function incorporates a resolution of the second-type 3D scanning sensor.

In accordance with an embodiment and any of the preceding embodiments, wherein performing the resolution-adaptive fusion further includes forming a 3D composite volumetric surface function by multiplying or adding the first volumetric surface function for the first-type 3D scanning sensor and the second volumetric surface function for the second-type 3D scanning sensor. Inaccurate point cloud data from one type 3D scanning sensor will be compensated by accurate point cloud data from the other type scanning sensor by forming the 3D composite volumetric surface function.

In accordance with an embodiment and any of the preceding embodiments, wherein forming the 3D composite volumetric surface function includes adding the first volumetric surface function and the second volumetric surface function in response to a condition that causes one of the 3D scanning sensors to be ineffective.

In accordance with an embodiment and any of the preceding embodiments, wherein forming the 3D composite volumetric surface function includes multiplying the first volumetric surface function and the second volumetric surface function to enhance a resolution for detecting an obstacle in the environment associated with the vehicle compared to using a volumetric surface function of only one of the 3D scanning sensors.

In accordance with an embodiment and any of the preceding embodiments, wherein performing the resolution-adaptive fusion further includes generating an iso-contour of the 3D composite volumetric surface function by performing automated edge-based thresholding to find a best resolution-adaptive iso-contour of the 3D composite volumetric surface function. The automated edge-based thresholding is based on volumetric surface function edge map optimization.

In accordance with an embodiment and any of the preceding embodiments, wherein performing the automated edge-based thresholding includes incrementing a threshold value over a preset range of values to determine the threshold value that maximizes a number of edges in a two-dimensional (2D) edge map of the iso-contour of the 3D composite volumetric surface function.

In accordance with an embodiment and any of the preceding embodiments, wherein performing the resolution-adaptive fusion further includes resampling the iso-contour of the 3D composite volumetric surface function on a uniform grid to form the fused, denoised, and resolution-optimized 3D point cloud.

In accordance with an embodiment and any of the preceding embodiments, wherein the method and set of functions of the system further include presenting a representation of the environment associated with the vehicle using the fused, denoised, and resolution-optimized 3D point cloud.

In accordance with an embodiment and any of the preceding embodiments, wherein the method and set of functions of the system further include using the fused, denoised, and resolution-optimized 3D point cloud to detect and avoid the obstacles by the vehicle.

In accordance with an embodiment and any of the preceding embodiments, wherein the method and set of functions of the system further include generating a sequence of fused, denoised, and resolution-optimized 3D point clouds and tracking a moving obstacle from among the obstacles using the sequence of fused, denoised, and resolution-optimized 3D point clouds.

In accordance with an embodiment and any of the preceding embodiments, wherein the first-type 3D scanning sensor comprises one of a radar, a stereo vision sensor, a monocular vision sensor, or a LIDAR sensor, and wherein the second-type 3D scanning sensor comprises a different-type sensor from the first-type 3D scanning sensor.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIGS. 4A and 4B are each an illustration of an example of measured points of different 3D point clouds and an associated resolution or measurement uncertainty of each measured point.

DETAILED DESCRIPTION

Figure 1A:
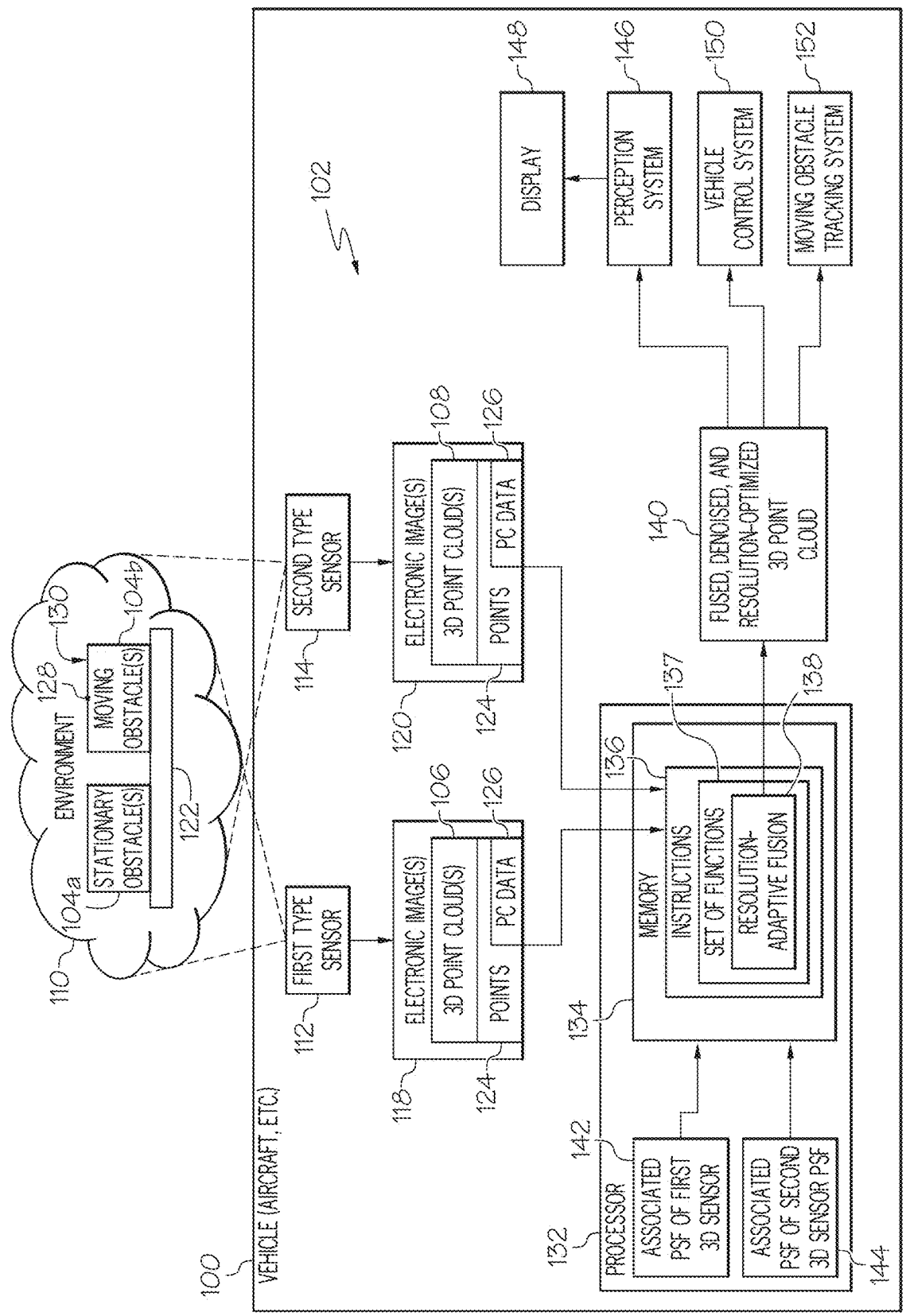
FIG. 1A is a block schematic diagram of an example of a vehicle including a system for obstacle detection and navigation of the vehicle using resolution-adaptive fusion of point clouds in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1A is a block schematic diagram of an example of a vehicle 100 including a system 102 for obstacle 104a or 104b detection and navigation of the vehicle 100 using resolution-adaptive fusion 138 of 3D point clouds 106 and 108 in accordance with an embodiment of the present disclosure. An example of a method 200 for performing resolution-adaptive fusion 138 will be described with reference to FIGS. 2A and 2B. In accordance with the example in FIG. 1A, the obstacle 104 includes one or more stationary obstacles 104a and one or more moving obstacles 104b in an environment 110 associated with the vehicle 100. In accordance with different examples, the vehicle 100 is an aircraft, an unmanned aerial vehicle (UAV), or other type autonomous vehicle.

The system 102 includes a first-type 3D scanning sensor 112 and at least a second-type 3D scanning sensor 114. In other embodiments, the system 102 includes more than two types of 3D scanning sensors 112 and 114. Examples of the types of 3D scanning sensors include but are not necessarily limited to any type of vision sensor, such as a stereo vision sensor or a monocular vision sensor, a Light Detection and Ranging (LIDAR) sensor, radar and any other type 3D sensing system that measures and tracks objects in large spatial volumes. Each different-type 3D scanning sensor 112 and 114 respectively collects one or more electronic images 118 and 120 of the environment 110 associated with the vehicle 100. As described in more detail herein, the electronic images 118 and 120 have different resolutions for different directions of view and distances from the 3D scanning sensor 112 or 114 based on the sensor resolution of the particular type 3D scanning sensor 112 and 114 for different directions and distances. In the example in FIG. 1A, the environment 110 includes a ground plane 122, one or more stationary obstacles 104a and one or more moving obstacles 104b.

Each electronic image 118 includes a 3D point cloud 106 and each electronic image 120 includes a 3D point cloud 108. Each 3D point cloud 106 and 108 includes a multiplicity of measured points 124 and each measured point 124 includes point cloud data 126. Each measured point 124 correspond to a point 128 on a surface 130 of one of the obstacles 104a and 104b in the environment 110 associated with the vehicle 100. The point cloud data 126 includes position or location information for the corresponding point 128 on the surface 130 of the obstacle 104a or 104b and measurement uncertainty as described in more detail with reference to FIGS. 4 and 5.

The system 102 also includes a processor 132 and a memory 134 associated with the processor 132. In the example of FIG. 1A, the memory 134 is shown as part of the processor 132. In other embodiments, the memory 134 is a separate component from the processor 132. The memory 134 includes computer-readable program instructions 136 that, when executed by the processor 132, cause the processor 132 to perform a set of functions 137. The set of functions 137 define the resolution-adaptive fusion 138 process. As described in more detail with reference to FIGS. 2A-2B, resolution-adaptive fusion 138 combines 3D point clouds, such as point clouds 106 and 108, from multiple types of 3D scanning sensors, e.g., 3D scanning sensors 112 and 114, with different resolutions in different dimensions or directions into a single uniformly sampled point cloud, for example, fused, denoised, and resolution-optimized 3D point cloud 140. The fused, denoised, and resolution-optimized 3D point cloud 140 has resolution in each dimension approximately equal to the resolution of a particular type 3D scanning sensor 112 or 114 that has the best resolution for that dimension or in that direction. Resolution-adaptive fusion 138 uses models of sensor resolution for different directions and distances to preferentially select the most accurate data in creating the fused, denoised, and resolution-optimized 3D point cloud 140. As described in more detail with reference to FIGS. 2A-2B, resolution-adaptive fusion 138 incorporates sensor resolution models to compensate for the poor resolution of a 3D scanning sensor 112 or 114 in one dimension by automatically suppressing low resolution data and replacing it with data from another 3D scanning sensor 112 or 114 that performs better in that dimension. This enables high performance sensing in all dimensions by using different-types of 3D scanning sensors 112 and 114. For example, at least the first-type 3D scanning sensor 112 has good performance in one or more dimensions and at least the second-type 3D scanning sensor 114 has good performance in the dimensions where the first-type scanning sensor 114 has poor performance. As a further example, resolution-adaptive fusion 138 enables replacing LIDAR with vision and radar 3D scanning sensors since vision and radar have complementary performance capabilities in different dimensions and environmental conditions. Another advantage of resolution-adaptive fusion 138 is that all parameters can be either calculated from sensor resolution models or automatically determined by the system 102 which enables resolution-adaptive fusion 138 to automatically adapt to the environment 110. As described in more detail with reference to FIGS. 2A and 2B, the resolution-adaptive fusion 138 performs a 3D convolution of each measured point 124 of the first 3D point cloud 106 with an associated 3D point spread function (PSF) 142 of the first-type 3D scanning sensor 112 to incorporate the sensor resolution of the first-type 3D scanning sensor 112 in generating the fused, denoised, and resolution-optimized 3D point cloud 140. The resolution-adaptive fusion 138 also performs a 3D convolution of each measured point 124 of the second 3D point cloud 108 with an associated 3D PSF 144 of the second-type scanning sensor 114 to incorporate the sensor resolution of the second-type 3D scanning sensor 114 in generating the fused, denoised, and resolution-optimized 3D point cloud 140. The sensor resolution models are represented by the 3D PSFs 142 and 144. The PSFs 142 and 144 can be spatially varying. For example, the range of resolution of a stereo vision sensor depends on the range of each 3D measured point 124 from the sensor.

In accordance with different exemplary embodiments, the vehicle 100 includes at least one of a perception system 146 and a display 148, a vehicle control system 150, and a moving obstacle tracking system 152. The perception system 146 is configured to use the fused, denoised, and resolution-optimized 3D point cloud 140 to detect and avoid obstacles 104a and 104b and for navigation of the vehicle 100 in the environment 110. For an example where the vehicle 100 is an aircraft, the fused, denoised, and resolution-optimized 3D point cloud 140 is presented on a display 148 to provide enhanced situational awareness to a flight crew of the obstacles 104a and 104b, for example, under adverse conditions, such as low visibility. In an example where the vehicle 100 is an unmanned aerial vehicle or autonomous vehicle, the perception system 146 uses the fused, denoised, and resolution-optimized 3D point cloud 140 to detect and avoid obstacles 104a and 104b.

The vehicle control system 150 is configured to use the fused, denoised, and resolution-optimized 3D point cloud 140 for navigation of the vehicle 100 and to avoid the obstacles 104a and 104b.

The moving obstacle tracking system 152 is configured to use a sequence of fused, denoised, and resolution-optimized 3D point clouds 140 to track one or more moving obstacles 104b. An example of generating a sequence of fused, denoised, and resolution-optimized 3D point clouds 140 for tracking moving obstacles 104b will be described in more detail with reference to FIGS. 2A-2B.

Figure 1B:
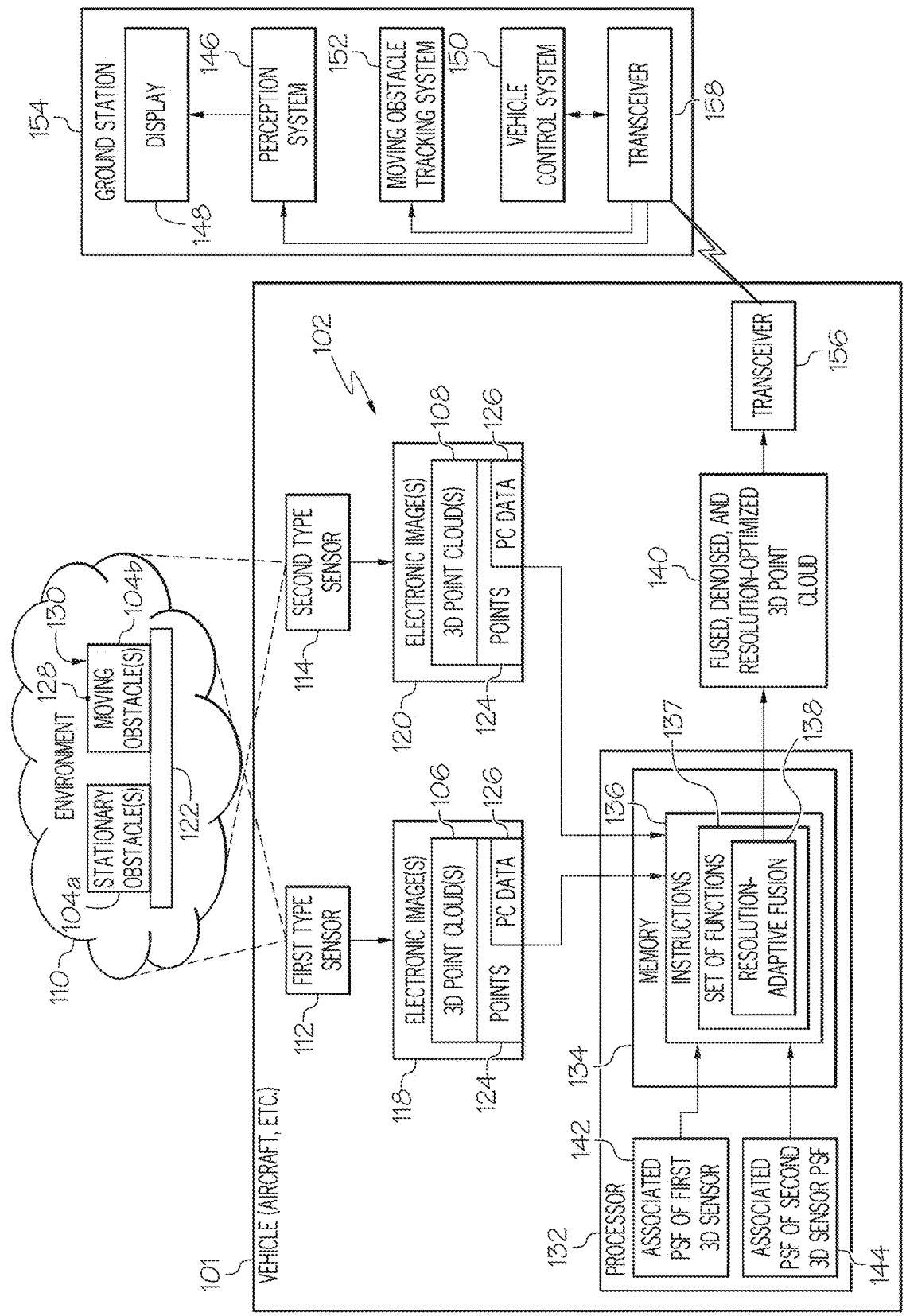
FIG. 1B is a block schematic diagram of an example of a vehicle including a system for obstacle detection and navigation of the vehicle using resolution-adaptive fusion of point clouds in accordance with another embodiment of the present disclosure.

FIG. 1B is a block schematic diagram of an example of a vehicle 101 including a system 102 for obstacle 104a and 104b detection and navigation of the vehicle 101 using resolution-adaptive fusion 138 of point clouds 106 and 108 in accordance with another embodiment of the present disclosure. The vehicle 101 is similar to the vehicle 100 in FIG. 1A except at least one of the perception system 146 and associated display 148, vehicle control system 150 and moving obstacle tracking system 152 are located at a ground station 154 or a remote station. In accordance with an example, the vehicle 101 is an autonomous vehicle, such as an unmanned aerial vehicle. The vehicle 101 includes a transceiver 156 for transmitting the fused, denoised, and resolution-optimized 3D point cloud 140 to another transceiver 158 at the ground station 154 for use by the perception system 146, vehicle control system 150, and moving obstacle tracking system 152 similar to that previously described. The transceiver 156 is also configured to receive control signals from the transceiver 158 of the ground station 154 to control operation of the vehicle 101.

In accordance with another embodiment, the processor 132 and associated memory 134 are also located at the ground station 154. In this embodiment, the transceiver 156 transmits the electronic images 118 and 120 including the respective 3D points clouds 106 and 108 to the transceiver 158 of the ground station 154. The resolution-adaptive fusion 138 is then performed by the ground station 154 and control signals are transmitted by the ground station 154 to the vehicle 101 for navigation of the vehicle 101 and avoidance of the obstacles 104a and 104b.

Figure 2A:
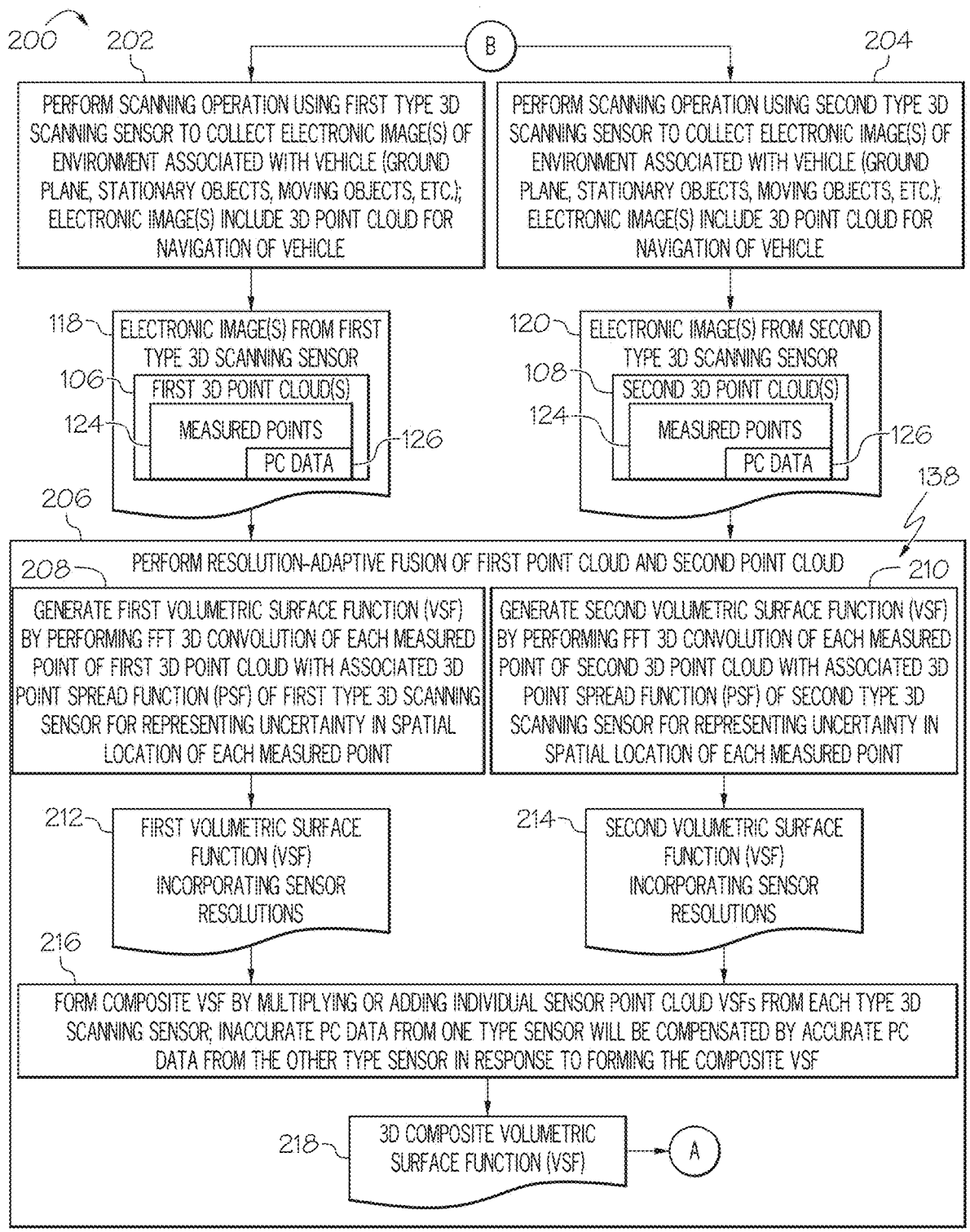
FIGS. 2A-2B are a flow chart of an example of a method for obstacle detection and navigation of a vehicle using resolution-adaptive fusion of point clouds in accordance with an embodiment of the present disclosure.
Figure 2B:
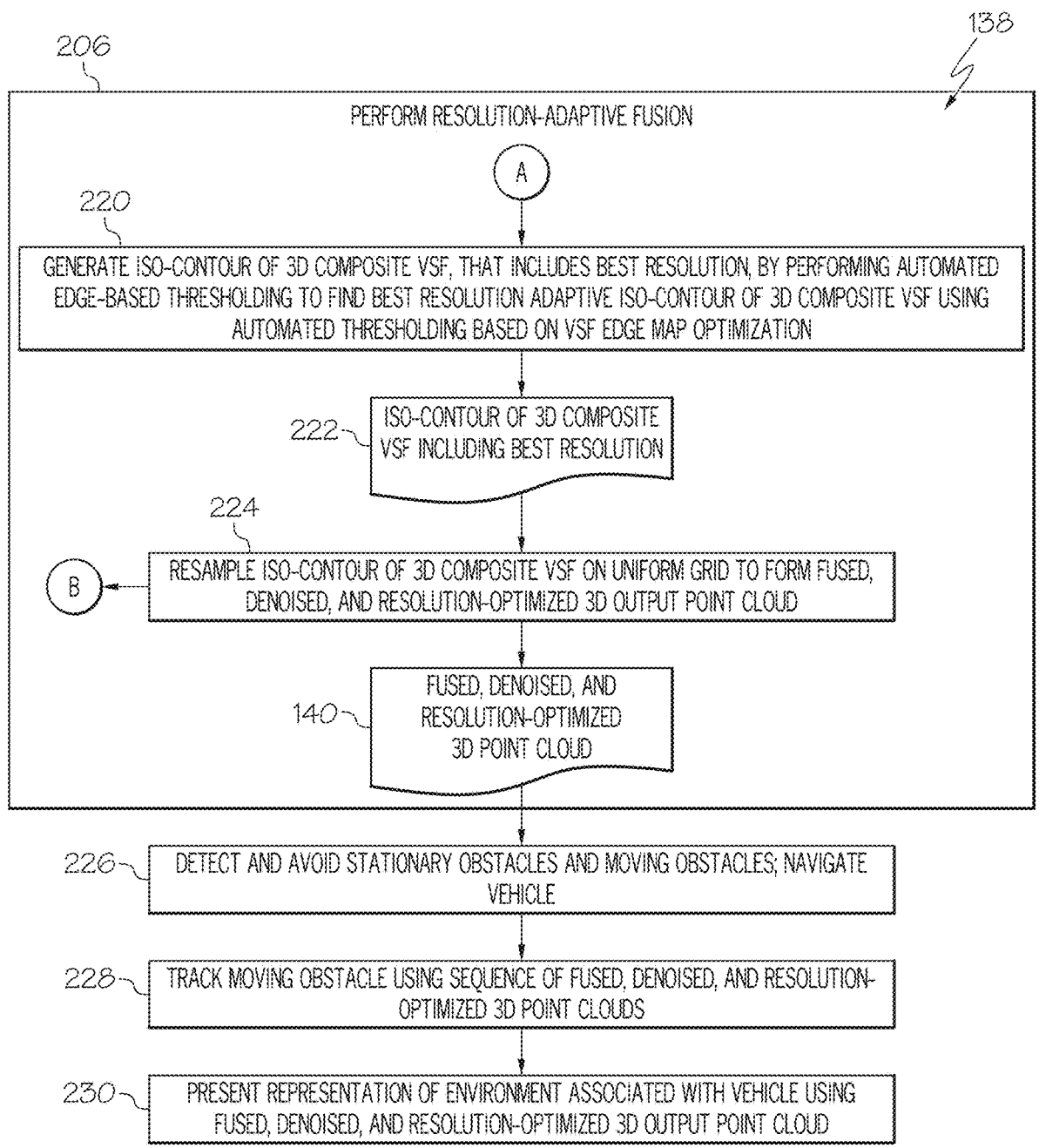

FIGS. 2A-2B are a flow chart of an example of a method 200 for obstacle 104a and 104b (FIGS. 1A and 1B) detection and navigation of a vehicle, such as vehicle 100 or 101 in FIGS. 1A and 1B, using resolution-adaptive fusion 138 of 3D points clouds 106 and 108 from different-types of 3D scanning sensors 112 and 114 (FIGS. 1A and 1B) in accordance with an embodiment of the present disclosure. In accordance with the example in FIG. 1A, at least some functions of the method 200 are embodied in the computer-readable program instructions 136 and resolution-adaptive fusion 138.

In block 202, a first scanning operation is performed using a first-type 3D scanning sensor 112 (FIGS. 1A and 1B) to collect one or more electronic images 118 of an environment 110 associated with the vehicle 100 or 101. In block 204, at least a second scanning operation is performed using a second-type 3D scanning sensor 114 to collect one or more electronic images 120. Each electronic image 118 from the first-type 3D scanning sensor 112 includes a first 3D point cloud 106 and each electronic image 120 from the second-type scanning sensor 114 includes a second 3D point cloud. As previously described, each 3D point cloud 106 and 108 includes a multiplicity of measured points 124. Each measured point 124 corresponds to a point 128 on a surface 130 of an obstacle 104a or 104b. Each measured point 124 includes point cloud data 126. The point cloud data 126 includes at least information that defines a location of the point 128 on the surface 130 of the obstacle 104a and 104b.

In block 206, resolution-adaptive fusion 138 is performed on at least the first 3D point cloud 106 and the second 3D point cloud 108 to generate the fused, denoised, and resolution-optimized 3D point cloud 140. In the exemplary embodiment in FIGS. 2A and 2B, the resolution-adaptive fusion 138 in block 206 includes blocks 208-224. The fused, denoised, and resolution-optimized 3D point cloud 140 represents an environment 110 associated with the vehicle 100 or 101. As previously described, the first 3D point cloud 106 is generated by the first-type 3D scanning sensor 112 and the second 3D point cloud 108 is generated by the second-type 3D scanning sensor 114. The second-type 3D scanning sensor 114 includes a different resolution in each of a plurality of different measurement dimensions relative to the first-type 3D scanning sensor 112. As previously discussed, the fused, denoised, and resolution-optimized 3D point cloud 140 is used to detect any obstacles 104a and 104b and navigate the vehicle 100 or 101.

A typical combination of at least first-type 3D scanning sensors 112 and second-type 3D scanning sensors 114 include, but are not necessarily limited to, vision sensors, radar, and LIDAR sensors. Each of these different-type 3D scanning sensors 112 and 114 have strengths, but also weaknesses that are compensated by one of the other type 3D scanning sensors 112 and 114. Since no one type 3D scanning sensor 112 or 114 has an ideal set of capabilities, multiple different-types of 3D scanning sensors 112 and 114 are utilized and fused together to form a unified representation of the environment 110 of the vehicle 100 or 101 for obstacle 104a and 104b detection and classification. For example, stereo or monocular vision 3D scanning sensors have good resolution in azimuth and elevation angles and range resolution that is good at short ranges, but they rapidly degrade for longer ranges. Vision 3D scanning sensors are also low cost and compact. LIDAR sensors offer excellent range resolution and intermediate azimuth and elevation resolution, but they are bulky and expensive. Both vision sensors and LIDAR sensors can be compromised by weather conditions. Radar has good range resolution, but poor resolution in azimuth and elevation. Unlike the other two sensors, radar can also measure velocity in the direction toward the radar using Doppler frequency shifts and can operate in all weather conditions. While the exemplary embodiments in FIGS. 1A and 1B illustrate at least a first-type 3D scanning sensor 112 and a second-type 3D scanning sensor 114, other embodiments include more than two types of 3D scanning sensors with different resolution characteristics, so that point cloud data 126 from the different-type sensors can be used to generate the fused, denoised, and resolution-optimized 3D point cloud 140 using the resolution-adaptive fusion 138 process described herein.

Figure 3A:
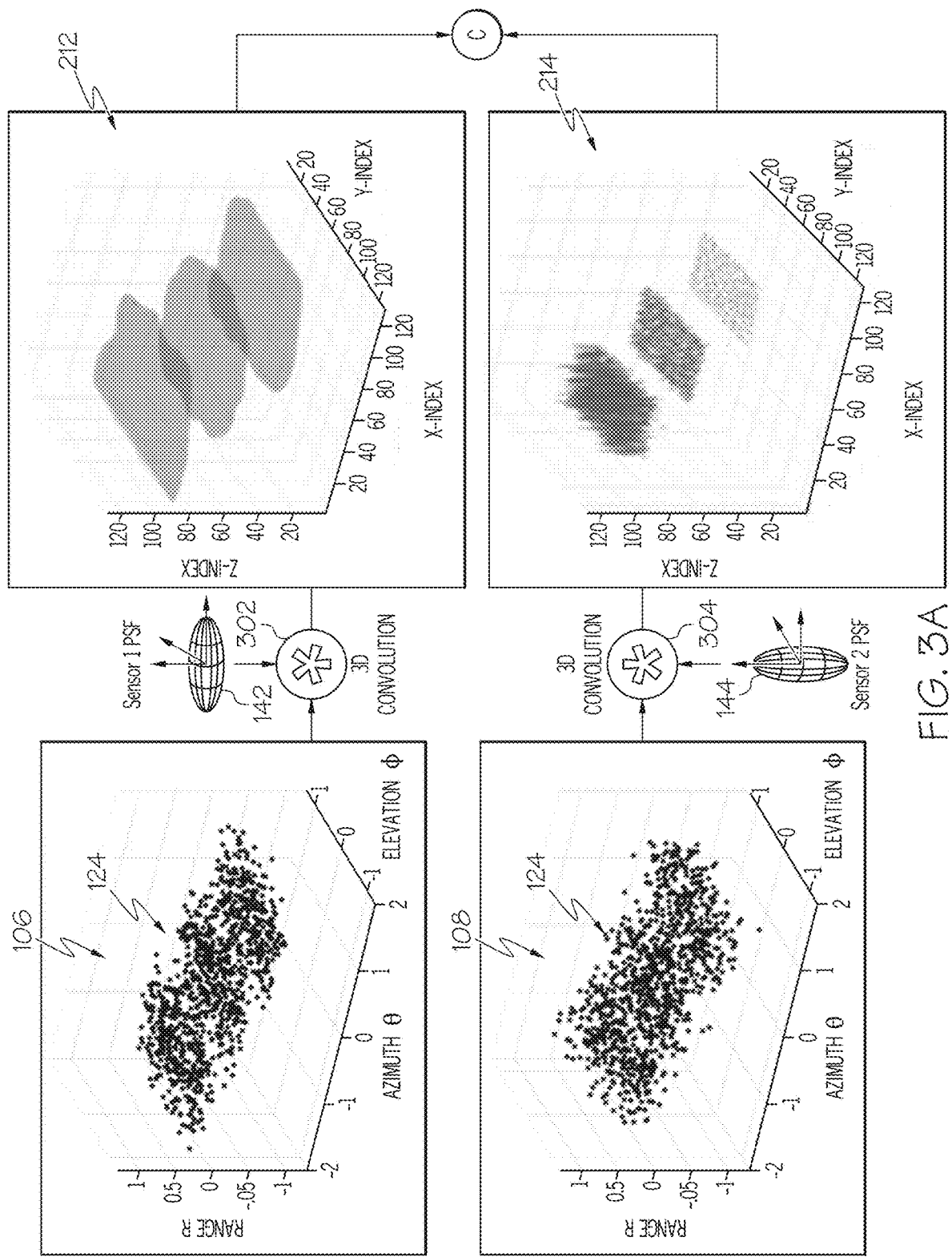
FIGS. 3A-3B are an illustration of the resolution-adaptive fusion processing flow of FIGS. 2A-2B.
Figure 3B:
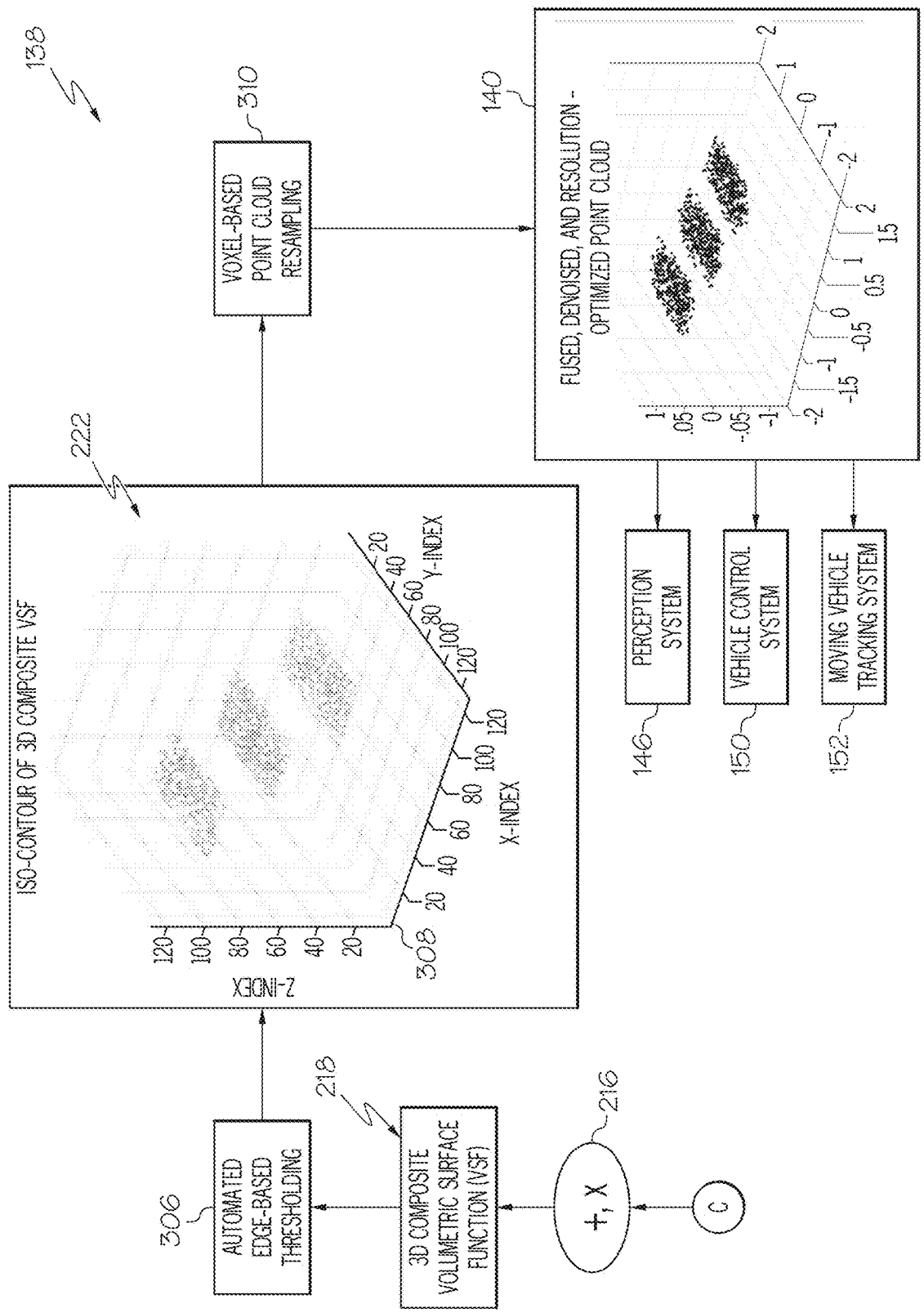

Referring also to FIGS. 3A-3B, FIGS. 3A-3B are an illustration of the resolution-adaptive fusion 138 processing flow in block 206 of FIGS. 2A-2B. In block 208 of FIG. 2A, a first volumetric surface function (VSF) 212 is generated by using a fast Fourier transform (FFT) in each of the three spatial dimensions to generate the 3D convolution 302 (FIG. 3A) of each measured point 124 from a plurality of measured points 124 of the first 3D point cloud 106 with an associated 3D PSF 142 of the first-type 3D scanning sensor 112 to represent the uncertainty in the spatial location of each measured point 124. The first VSF 212 incorporates a resolution of the first-type 3D scanning sensor 112.

In block 210, a second VSF 214 is generated by performing an FFT 3D convolution 304 (FIG. 3A) of each measured point 124 from a plurality of measured points 124 of the second 3D point cloud 108 with an associated 3D PSF 144 of the second-type 3D scanning sensor 114 to represent the uncertainty in the spatial location of each measured point 124 of the second 3D point cloud 108. The second VSF 214 incorporates a resolution of the second-type 3D scanning sensor 114.

Resolution-adaptive fusion 138 assumes sensor resolution models are available for the resolution of each of the 3D scanning sensors 112 and 114 in different viewing directions and distances. These resolution models can be determined analytically from sensor physical models or empirically from measurements of resolution targets at several positions that are then interpolated to cover the entire measurement volume. Values of resolution or measurement uncertainty are associated with each measured point 124 in the 3D point cloud 106 and 108 as illustrated in FIG. 4. FIG. 4 is an illustration of an example of measured points 124 of different 3D point clouds 106 and 108 and an associated resolution or measurement uncertainty 402 of each measured point 124. Each measured point 124 is defined by its position and its position-dependent measurement uncertainty 3D point spread function (PSF) 142 or 144 which is formed from a product of Gaussians for each dimension. The PSF axes correspond to the resolutions or standard deviations $\sigma_x$, $\sigma_y$, and $\sigma_z$ (FIG. 5) in range and two transverse directions of the measured point 128 on the obstacle 104a or 104b as seen from the 3D scanning sensor 112 or 114 that measured the point 128. The orientation of the PSF 142 and 144 is represented by two angles, azimuth ($\theta$) and elevation ($\phi$). A total of eight parameter values are associated with each measured point 124 to represent both the position and measurement uncertainty of the point 124 in any direction and for any distance. The PSF 142 or 144 can potentially vary with location in the measurement volume depending on the sensor characteristics.

Figure 5:
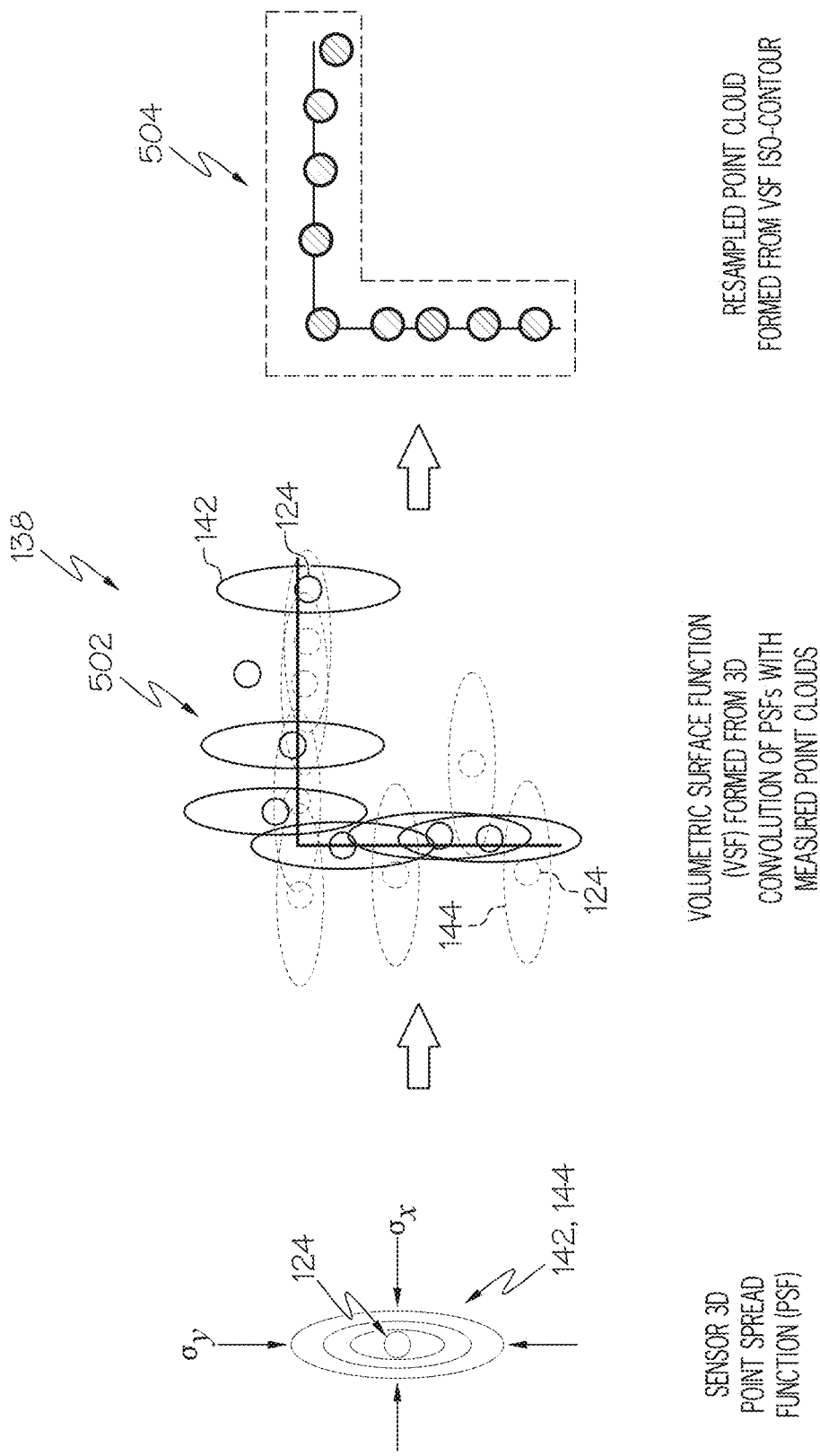
FIG. 5 is an illustration of forming a volumetric surface function incorporating sensor resolutions by convolution of measured points of a 3D point cloud with the associated point spread function (PSF) for a particular type 3D scanning sensor that generated the 3D point cloud in accordance with an embodiment of the present disclosure.

Since the 3D scanning sensors 112 and 114 have different resolutions in different directions and distances, the resolution-adaptive fusion 138 is configured to preferentially utilize the point cloud data 126 with the best resolution from each 3D scanning sensor 112 and 114. The basic principle of the resolution-adaptive fusion 138 is illustrated in FIG. 5. Resolution-adaptive fusion 138 uses an intermediate "implicit" volumetric representation 502 of the evidence for object surfaces in a spatial volume to generate a new higher accuracy point cloud 504 with reduced noise that is sampled on a uniform spatial grid. Unlike "explicit" representations of surfaces, which are lists of points on the surface with their 3D coordinates, implicit methods represent a surface in terms of functions defined in the 3D space. For example, one possible implicit representation is a 3D function whose value at each 3D voxel is given by the density of points at that location. Another implicit representation, which resolution-adaptive fusion 138 utilizes, is to define a surface as an iso-contour or level set of a 3D function that models the resolutions of the 3D scanning sensors 112 and 114 at different locations and in different directions. In resolution-adaptive fusion 138, the 3D function is the Volumetric Surface Functions (VSFs) 212 and 214 formed by convolving the measured points 124 measured by each 3D scanning sensor 112 and 114 with the associated 3D PSF 142 and 144 of each 3D scanning sensor 112 and 114. The PSF 142 and 144 represents the uncertainty in position of each measured point 124 in all directions and can be modeled as a product of Gaussians with position, shape, and orientation of the PSF 142 and 144 reflecting the resolution properties of the particular 3D scanning sensor 112 and 114. The PSFs 142 and 144 are derived from a priori sensor models or measured empirically from data. The 3D convolution 302 and 304 replaces each measured point 124 with the associated sensor's 3D PSF 142 or 144 for that location, as shown in FIG. 5, and are efficiently implemented using fast Fourier transforms.

The VSFs 212 and 214 are each a 3D voxel-based 3D volumetric representation of the 3D point cloud 106 or 108 that is a measure of the evidence for a surface 130 of an obstacle 104a or 104b at every 3D spatial location which incorporates the resolutions of the corresponding 3D scanning sensors 112 and 114. The VSFs 212 and 214 are analogous to how a computed axial tomography (CAT) scan is a 3D function that maps body tissue density. As more points 124 are measured, the most likely surface locations will correspond to voxels with the highest values of VSF due to overlapping of PSFs from multiple measured points 124.

In block 216, a 3D composite VSF 218 is formed by multiplying or adding the first VSF 212 for the first-type 3D scanning sensor 112 (FIGS. 1A and 1B) and the second VSF 214 for the second-type 3D scanning sensor 114 (FIGS. 1A and 1B). Inaccurate point cloud data 126 from one type 3D scanning sensor 112 or 114 will be compensated by accurate point cloud data 126 from the other type 3D scanning sensor 112 or 114 by forming the 3D composite VSF 218. The 3D composite VSF 218 is formed by adding the first VSF 212 and the second VSF 214 in response to a condition that causes one of the 3D scanning sensors 112 or 114 to be ineffective. The 3D composite VSF 218 is formed by multiplying the first VSF 212 and the second VSF 214 to enhance a resolution for detecting an obstacle 104a or 104b in the environment 110 associated with the vehicle 100 or 101 compared to using a VSF 212 or 214 of only one of the 3D scanning sensors 112 or 114. Multiplication of the VSFs 212 and 214 is appropriate when all obstacles in the environment are detected by two or more 3D scanning sensors 112 and 114 since the composite resolution in each dimension will be that of the higher-resolution 3D scanning sensor 112 or 114 for that dimension. However, if an obstacle 104a or 104b is detected by only one 3D scanning sensor 112 or 114, then the VSF 212 or 214 of the other sensor 112 or 114 won't cover that obstacle 104a and 104b and the product of the VSFs 212 and 214 will be zero for that obstacle 104a or 104b. However, if the VSFs 212 and 214 are added together, then obstacles 104a or 104b detected by only one 3D scanning sensor 112 or 114 will be represented in the 3D composite VSF 218. The resolution of obstacles 104a and 104b detected by multiple 3D scanning sensors 112 and 114 may then not be improved as much as in the multiplicative case, although simulations show that the performance improvement is still high. The preferred operating mode may be to calculate results for both multiplying and adding the VSFs 212 and 214, using the additive VSF to initially detect obstacles 104a and 104b, and then refine the resolution of the obstacles 104a and 104b using the multiplicative VSF.

In block 220 in FIG. 2B, an iso-contour 222 (see also FIG. 3B) of the 3D composite VSF 218 is generated by performing automated edge-based thresholding 306 (FIG. 3B) to find a best resolution-adaptive iso-contour 222 of the 3D composite VSF 218. The automated edge-based thresholding 306 is based on VSF edge map optimization. An example of a method for automated edge-based thresholding will be described with reference to FIGS. 6 and 7. As described in more detail with reference to FIGS. 7 and 8, performing the automated edge-based thresholding 306 includes increasing a threshold value 702a-702c over a preset range of values to determine the threshold value (702b in the example in FIG. 7) that maximizes a number of edges in a two-dimensional (2D) edge map 704b of the iso-contour 222 of the 3D composite VSF 218.

In block 224, performing the resolution-adaptive fusion 138 further includes resampling the iso-contour 222 of the 3D composite VSF 218 on a uniform grid 308 (FIG. 3B) to form the fused, denoised, and resolution-optimized 3D point cloud 140. In accordance with an example, the resampling includes voxel-based point cloud resampling 310 (FIG. 3B) of the iso-contour 222 of the 3D composite VSF 218 to provide the fused, denoised, and resolution-optimized 3D point cloud 140. Voxel-based point cloud resampling uses as inputs the point cloud points 124 measured by sensors 112 and 114 that are irregularly distributed in 3D space due to the local topography of the sensed environment. The 3D composite VSF 218 is a continuous function defined in 3D space that is generated by convolving each measured point 124 in each point cloud 106 and 108 with the associated sensor's local PSF 142 and 144. The 3D volume domain of the 3D composite VSF 218 can be subdivided into regularly spaced contiguous voxels whose values are the local average of the 3D composite VSF 218 over the voxel volume, thereby performing a spatial sampling of the 3D composite VSF 218. Thresholding the 3D composite VSF 218 then results in an iso-contour 222 surface of the 3D composite VSF 218 that is sampled at the voxel locations. The voxels that are above the threshold value can then be replaced by points centered on those above-threshold voxels. These new points form a resampled point cloud on a regularly-spaced 3D grid which is a fused, denoised, and resolution-optimized point cloud 140 formed from the individual sensor measured point clouds 106 and 108.

In accordance with an embodiment, the method 200 returns to blocks 202 and 204 and the method 200 repeats as previously described. The method 200 is repeated a predetermined number of times or continuously during operation of the vehicle 100 or 101 to generate a sequence of fused, denoised, and resolution-optimized 3D points clouds 140. In block 226, the sequence of fused, denoised, and resolution-optimized 3D point clouds 140 are used to navigate the vehicle 100 or 101 and to detect and avoid stationary obstacles 104a and moving obstacles 104b in block 226.

In block 228, a moving obstacle 104b is tracked using the sequence of fused, denoised, and resolution-optimized 3D points clouds 140. In block 230, a representation of the environment 110 associated with the vehicle 100 or 101 is presented on the display 148 using the fused, denoised, and resolution-optimized 3D point cloud 140 or sequence of fused, denoised, and resolution-optimized 3D point clouds 140.

Figure 6:
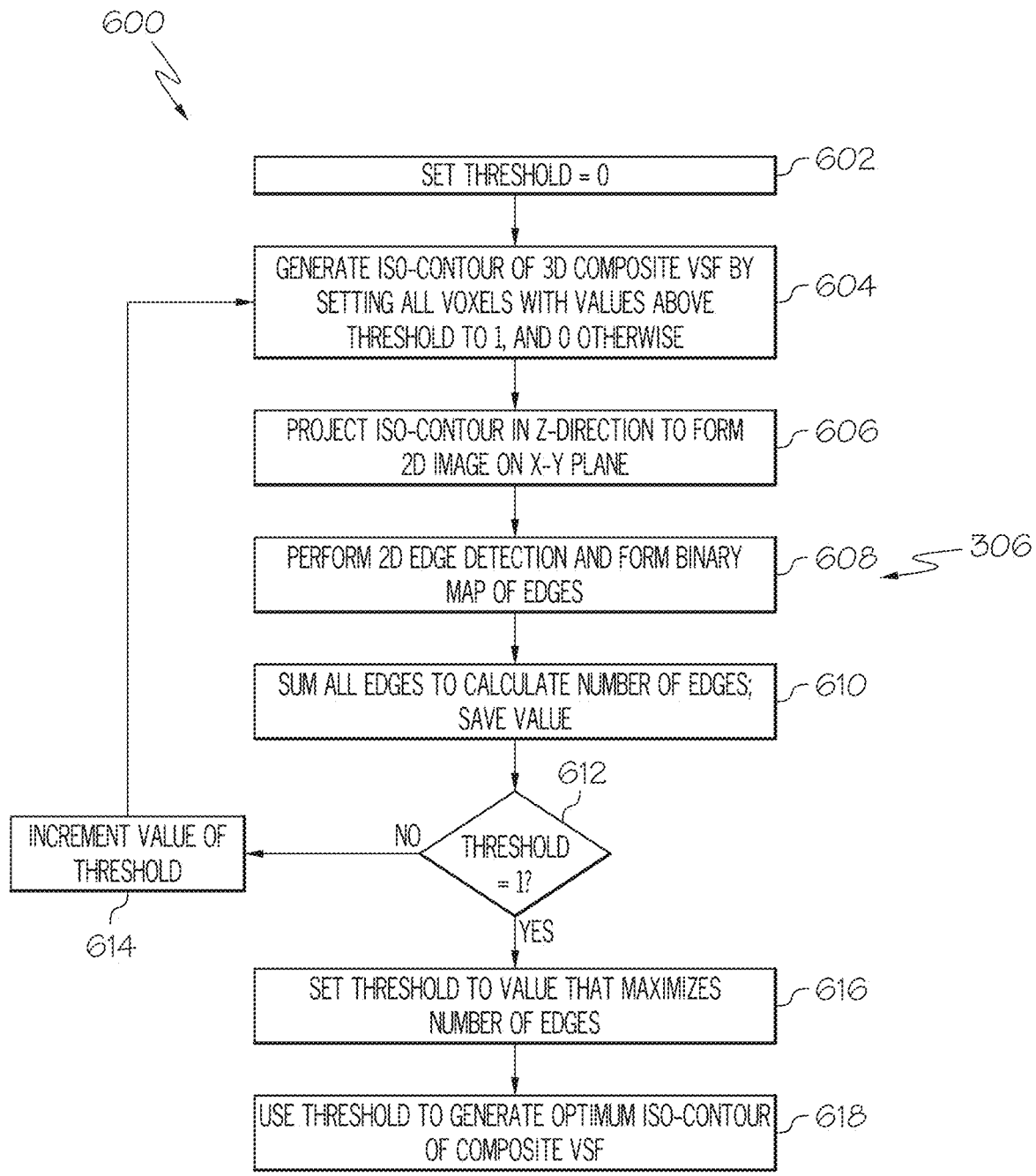
FIG. 6 is a flow chart of an example of a method for performing automated edge-based thresholding to find a best resolution-adaptive iso-contour of the 3D composite volumetric surface function (VSF) in accordance with an embodiment of the present disclosure.

FIG. 6 is a flow chart of an example of a method 600 for performing automated edge-based thresholding 306 (FIG. 3B) to find a best resolution-adaptive iso-contour 222 of the 3D composite VSF 218 in accordance with an embodiment of the present disclosure. The automated edge-based thresholding 306 is based on volumetric surface function (VSF) edge map optimization 700 as performed by method 600 and illustrated in FIG. 7. In block 602 of FIG. 6, a threshold value is set to zero (0). In block 604, an iso-contour 222 of the 3D composite VSF 218 is generated by setting all voxels with values above the threshold value to 1, and 0 otherwise.

In block 606, the iso-contour 222 of the 3D composite VSF 218 is projected in a Z-direction to form a two-dimensional (2D) image 706 (FIG. 7) on an X-Y plane.

In block 608, 2D edge detection is performed and a binary map 704a-704c of the edges is formed. The binary map 704a-704c can be considered to be an image where pixels are valued 1 at an edge location and 0 everywhere else. Summing all the pixels in the binary map image is therefore a measure of the number of edge pixels.

In block 610, all pixels in the binary edge map 704a-704c are summed to measure the quantity of edges. The value of the sum of all edges is saved.

In block 612, a determination is made if the threshold value is equal to one (1). If the threshold value is not equal one (1), the value of the threshold is incremented by a preset amount less than one (1) and the method 600 returns to block 604. The method 600 then proceeds as previously described.

If the threshold value in block 612 is equal to one (1), the method 600 advances to block 616. In block 616, the threshold is set to the value that maximizes the number of edges. In block 618, the set threshold value is used to generate the optimum iso-contour 222 of the 3D composite VSF 218.

Figure 7:
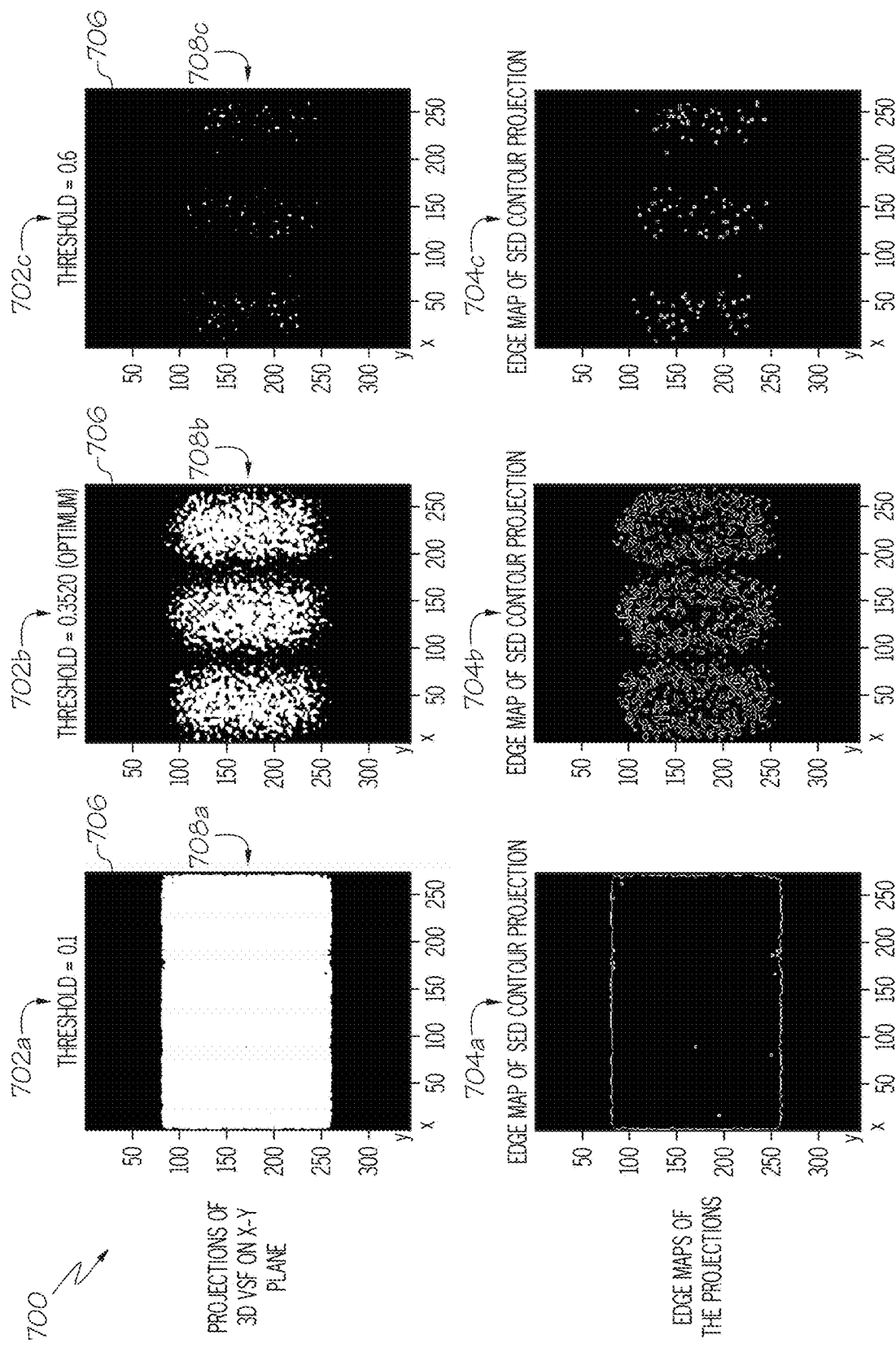
FIG. 7 is an illustration of the automated edge-based thresholding of FIG. 6 to find the best resolution-adaptive iso-contour of the 3D composite VSF.

Referring also to FIG. 7, FIG. 7 is an illustration of the automated edge-based thresholding 306 of FIG. 6 to find the best resolution-adaptive iso-contour 222 of the 3D composite VSF 218. As illustrated in FIG. 7, as the threshold value 702a-702c increases from a small value, i.e., 0.1 to larger threshold values, the 2D projection (block 606 in FIG. 6) of the iso-contour 222 on the X-Y plane consists of a single large 3D blob 708a that then separates into smaller 3D blobs 708b-708c centered on each obstacle 104a or 104b as the threshold value 702a-702c is incremented (block 614). These blobs 708a-708c then continue to shrink until a certain threshold value, for example 702b, is reached where the blobs 708b break up into 3D "islands" centered on each measure point 124. This threshold value 702b is optimal in the sense that it is the largest threshold value that minimizes the volume of the iso-contour 222 (and hence improves the resolution) while still maintaining full coverage of the obstacle 104a or 104b. As the threshold value 702a-702c is increased beyond this point, the blobs 708a-708c will shrink until they practically disappear (blob 708c). A simple calculated variable that can be used to detect the optimal threshold value is the total length of edges in an edge map 706 of the projection of the iso-contour 222 on a 2D plane or the X-Y plane as illustrated in FIG. 7. By increasing the threshold value 702a-702c over a range of values and selecting the threshold value that maximizes the total 3D composite VSF iso-contour 222 edge length, as shown in FIGS. 7 and 8, the threshold value 702a-702c can be set automatically.

Figure 8:
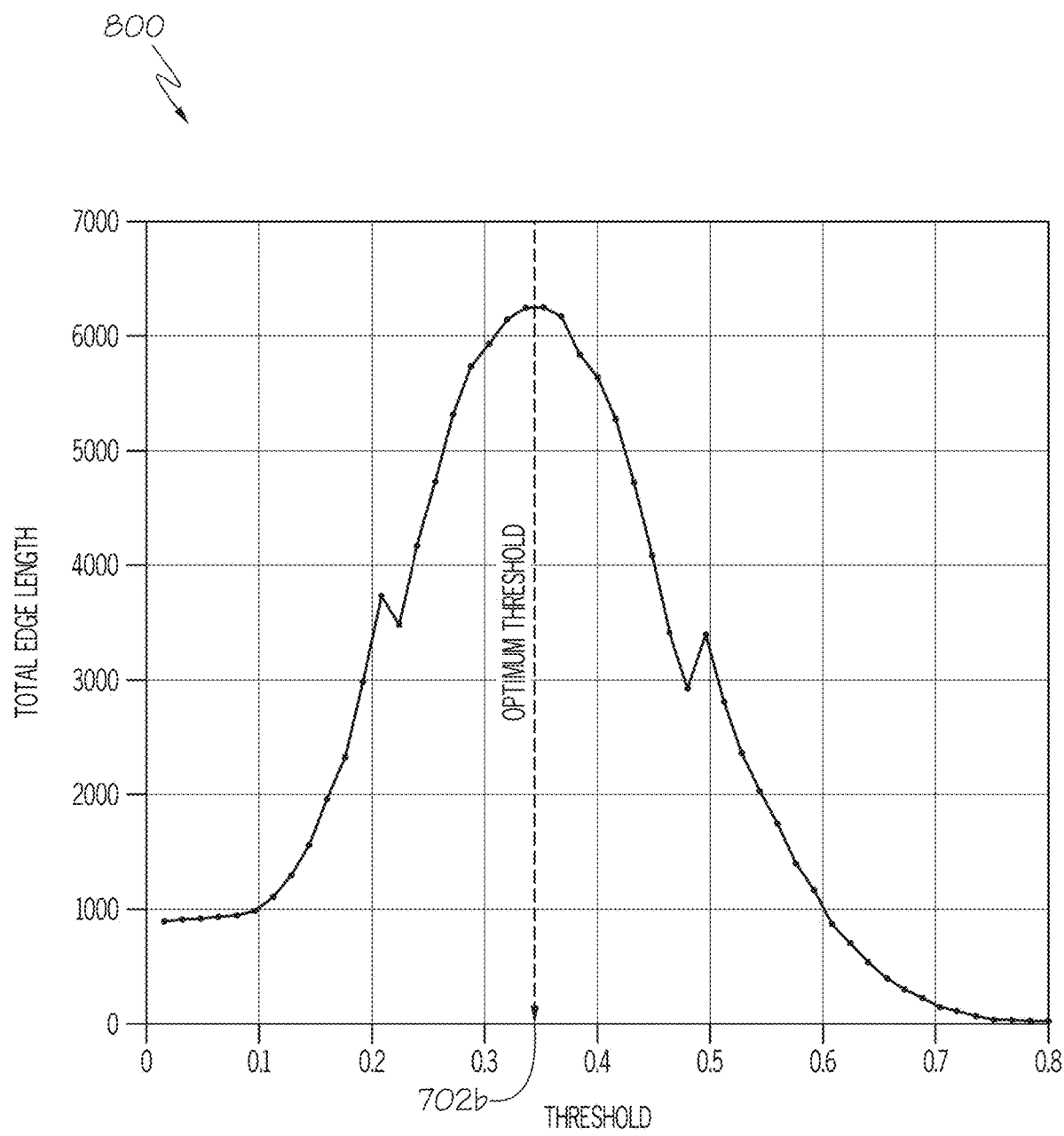
FIG. 8 is an illustration of an example of a graph of variation of a total length of edges in a 2D projection edge map of an iso-contour of a VSF versus threshold value in accordance with an embodiment of the present disclosure.

FIG. 8 is an illustration of an example of a graph 800 of variation of a total length of edges in a 2D projection edge map 706 (FIG. 7) of an iso-contour 222 of a VSF versus threshold value in accordance with an embodiment of the present disclosure. As illustrated in FIG. 8, the optimum threshold value 702b for combining sensor data is the threshold value that maximized the total edge length.

While the exemplary method 200 in FIGS. 2A and 2B includes two scanning operations to generate a first and second 3D point cloud 106 and 108, in accordance with other embodiments, more than two scanning operations are performed. In another embodiment, at least a third scanning operation is performed by a third-type 3D scanning sensor to generate at least a third 3D point cloud. The resolution-adaptive fusion 138 is then performed using at least three 3D point clouds. Resolution-adaptive fusion 138 may be performed using any number of 3D point clouds generated by different-types of 3D scanning sensors to generate the fused, denoised, and resolution-optimized 3D point cloud 140.

From the embodiments described herein, those skilled in art will recognize that resolution-adaptive fusion 138 is applicable for any platform that utilizes multiple sensors to sense an environment in 3D for applications such as obstacle detection and navigation by taxiing aircraft, unmanned aerial vehicles, and other autonomous vehicles. Resolution-adaptive fusion 138 improves the 3D resolution of the sensor system by enabling one sensor to compensate for a second sensor's poor resolution in a particular measurement direction or the second sensor's inability to function effectively in the current weather and/or lighting conditions. For example, resolution-adaptive fusion 138 is configurable to automatically switch between low-cost and compact vision and radar sensors for different ranges and azimuth/elevation angles to create a high resolution fused 3D point cloud using the best sensor for each dimension. One potential application is to reduce or eliminate the need for expensive, low-resolution, and LIDAR sensors using a combination of radar and vision sensors.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "include," "includes," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for obstacle detection and navigation of a vehicle using resolution-adaptive fusion, the method comprising:

performing, by a processor, a resolution-adaptive fusion of at least a first three-dimensional (3D) point cloud and a second 3D point cloud to generate a fused, denoised, and resolution-optimized 3D point cloud that represents an environment associated with the vehicle, wherein the first 3D point cloud is generated by a first-type 3D scanning sensor and the second 3D point cloud is generated by a second-type 3D scanning sensor, wherein the second-type 3D scanning sensor includes a different resolution in each of a plurality of different measurement dimensions relative to the first-type 3D scanning sensor, and wherein said performing the resolution-adaptive fusion further comprises:

generating a first volumetric surface function that incorporates a resolution of the first-type 3D scanning sensor;

generating a second volumetric surface functions that incorporates a resolution of the second-type 3D scanning sensor;

forming a 3D composite multiplicative volumetric surface function by multiplying the first volumetric surface function for the first-type 3D scanning sensor and the second volumetric surface function for the second-type 3D scanning sensor; and forming a 3D composite additive volumetric surface function by adding the first volumetric surface function and the second volumetric surface function, wherein the 3D composite additive volumetric surface function is used to detect the obstacles and the 3D composite multiplicative volumetric surface function is used to refine a resolution of the obstacles; and navigating the vehicle using the fused, denoised, and resolution-optimized 3D point cloud.

2. The method of claim 1, wherein said performing the resolution-adaptive fusion comprises:

generating the first volumetric surface function by performing a 3D convolution of each measured point from a plurality of measured points of the first 3D point cloud with an associated 3D point spread function of the first-type 3D scanning sensor for representing an uncertainty in a spatial location of each measured point, wherein the first volumetric surface function incorporates a resolution of the first-type 3D scanning sensor; and generating the second volumetric surface function by performing a 3D convolution of each measured point from a plurality of measured points of the second 3D point cloud with an associated 3D points spread function of the second-type 3D scanning sensor for representing an uncertainty in a spatial location of each measured point, wherein the second volumetric surface function incorporates a resolution of the second-type 3D scanning sensor.

3. The method of claim 2, wherein said performing the resolution-adaptive fusion further comprises forming a 3D composite volumetric surface function by multiplying or adding the first volumetric surface function for the first-type 3D scanning sensor and the second volumetric surface function for the second-type 3D scanning sensor, wherein inaccurate point cloud data from one type 3D scanning sensor will be compensated by accurate point cloud data from the other type scanning sensor by said forming the 3D composite volumetric surface function.

4. The method of claim 3, wherein said forming the 3D composite volumetric surface function comprises adding the first volumetric surface function and the second volumetric surface function in response to a condition that causes one of the 3D scanning sensors to be ineffective.

5. The method of claim 3, wherein said forming the 3D composite volumetric surface function comprises multiplying the first volumetric surface function and the second volumetric surface function to enhance a resolution for detecting an obstacle in the environment associated with the vehicle compared to using a volumetric surface function of only one of the 3D scanning sensors.

6. The method of claim 3, wherein said performing the resolution-adaptive fusion further comprises generating an iso-contour of the 3D composite volumetric surface function by performing automated edge-based thresholding to find a best resolution-adaptive iso-contour of the 3D composite volumetric surface function, wherein the automated edge-based thresholding is based on volumetric surface function edge map optimization.

7. The method of claim 6, wherein said performing the automated edge-based thresholding comprises incrementing a threshold value over a preset range of values to determine the threshold value that maximizes a number of edges in a two-dimensional (2D) edge map of the iso-contour of the 3D composite volumetric surface function.

8. The method of claim 6, wherein said performing the resolution-adaptive fusion further comprises resampling the iso-contour of the 3D composite volumetric surface function on a uniform grid to form the fused, denoised, and resolution-optimized 3D point cloud.

9. The method of claim 1, further comprising presenting a representation of the environment associated with the vehicle using the fused, denoised, and resolution-optimized 3D point cloud.

10. The method of claim 9, further comprising using the fused, denoised, and resolution-optimized 3D point cloud to detect and avoid the obstacles by the vehicle.

11. The method of claim 1, wherein the first-type 3D scanning sensor comprises one of a radar, a stereo vision sensor, a monocular vision sensor, or a LIDAR sensor, and wherein the second-type 3D scanning sensor comprises a different-type sensor from the first-type 3D scanning sensor.

12. A system for obstacle detection and navigation of a vehicle using resolution-adaptive fusion, the system comprising:

a processor; and a memory associated with the processor, wherein the memory includes computer-readable program instructions that, when executed by the processor, causes the processor to perform a set of functions comprising:

performing a resolution-adaptive fusion of at least a first three-dimensional (3D) point cloud and a second 3D point cloud to generate a fused, denoised, and resolution-optimized 3D point cloud that represents an environment associated with the vehicle, wherein the first 3D point cloud is generated by a first-type 3D scanning sensor and the second 3D point cloud is generated by a second-type 3D scanning sensor, wherein the second-type 3D scanning sensor includes a different resolution in each of a plurality of different measurement dimensions relative to the first-type 3D scanning sensor, and wherein said performing the resolution-adaptive fusion further comprises:

generating a first volumetric surface function that incorporates a resolution of the first-type 3D scanning sensor;

generating a second volumetric surface functions that incorporates a resolution of the second-type 3D scanning sensor;

forming a 3D composite multiplicative volumetric surface function by multiplying the first volumetric surface function for the first-type 3D scanning sensor and the second volumetric surface function for the second-type 3D scanning sensor; and forming a 3D composite additive volumetric surface function by adding the first volumetric surface function and the second volumetric surface function, wherein the 3D composite additive volumetric surface function is used to detect the obstacles and the 3D composite multiplicative volumetric surface function is used to refine a resolution of the obstacles; and navigating the vehicle using the fused, denoised, and resolution-optimized 3D point cloud.

13. The system of claim 12, wherein said performing the resolution-adaptive fusion comprises:

generating the first volumetric surface function by performing a 3D convolution of each measured point from a plurality of measured points of the first 3D point cloud with an associated 3D point spread function of the first-type 3D scanning sensor for representing an uncertainty in a spatial location of each measured point, wherein the first volumetric surface function incorporates a resolution of the first-type 3D scanning sensor; and generating the second volumetric surface function by performing a 3D convolution of each measured point from a plurality of measured points of the second 3D point cloud with an associated 3D points spread function of the second-type 3D scanning sensor for representing an uncertainty in a spatial location of each measured point, wherein the second volumetric surface function incorporates a resolution of the second-type 3D scanning sensor.

14. The system of claim 13, wherein said performing the resolution-adaptive fusion further comprises forming a 3D composite volumetric surface function by multiplying or adding the first volumetric surface function for the first-type 3D scanning sensor and the second volumetric surface function for the second-type 3D scanning sensor, wherein inaccurate point cloud data from one type 3D scanning sensor will be compensated by accurate point cloud data from the other type scanning sensor by said forming the 3D composite volumetric surface function.

15. The system of claim 14, wherein said forming the 3D composite volumetric surface function comprises adding the first volumetric surface function and the second volumetric surface function in response to a condition that causes one of the 3D scanning sensors to be ineffective.

16. The system of claim 14, wherein said forming the 3D composite volumetric surface function comprises multiplying the first volumetric surface function and the second volumetric surface function to enhance a resolution for detecting an obstacle in the environment associated with the vehicle compared to using a volumetric surface function of only one of the 3D scanning sensors.

17. The system of claim 14, wherein said performing the resolution-adaptive fusion further comprises generating an iso-contour of the 3D composite volumetric surface function by performing automated edge-based thresholding to find a best resolution-adaptive iso-contour of the 3D composite volumetric surface function, wherein the automated edge-based thresholding is based on volumetric surface function edge map optimization.

18. The system of claim 17, wherein said performing the automated edge-based thresholding comprises increasing a threshold value over a preset range of values to determine the threshold value that maximizes a number of edges in a two-dimensional (2D) edge map of the iso-contour of the 3D composite volumetric surface function.

19. The system of claim 17, wherein said performing the resolution-adaptive fusion further comprises resampling the iso-contour of the 3D composite volumetric surface function on a uniform grid to form the fused, denoised, and resolution-optimized 3D point cloud.

20. The method of claim 1, further comprising:

generating a sequence of fused, denoised, and resolution-optimized 3D point clouds during operation of the vehicle; and tracking a moving obstacle from among the obstacles using the sequence of fused, denoised, and resolution-optimized 3D point clouds to navigate the vehicle and to detect and avoid the moving obstacle.

* * * * *